United States Patent
Filip et al.

(10) Patent No.: US 9,035,520 B2
(45) Date of Patent: May 19, 2015

(54) ROTOR LAMINATION STRESS RELIEF

(75) Inventors: Ethan L. Filip, Christiansburg, VA (US);
Stephen J. Funk, Riner, VA (US);
Jeffrey Todd Brewster, Dublin, VA (US)

(73) Assignee: KOLLMORGEN CORPORATION, Radford, VA (US)

( * ) Notice: Subject to any disclaimer, the term of this patent is extended or adjusted under 35 U.S.C. 154(b) by 428 days.

(21) Appl. No.: 13/479,408

(22) Filed: May 24, 2012

(65) Prior Publication Data
US 2013/0313937 A1 Nov. 28, 2013

(51) Int. Cl.
*H02K 1/27* (2006.01)

(52) U.S. Cl.
CPC .............. *H02K 1/276* (2013.01); *H02K 1/27* (2013.01); *H02K 1/2766* (2013.01)

(58) Field of Classification Search
USPC ..................................... 310/156.53
See application file for complete search history.

(56) References Cited

U.S. PATENT DOCUMENTS

| | | | |
|---|---|---|---|
| 5,117,553 A | 6/1992 | Kliman | |
| 6,087,751 A * | 7/2000 | Sakai | 310/156.56 |
| 6,225,724 B1 | 5/2001 | Toide et al. | |
| 6,340,857 B2 | 1/2002 | Nishiyama et al. | |
| 6,525,442 B2 | 2/2003 | Koharagi et al. | |
| 6,700,288 B2 | 3/2004 | Smith | |
| 6,794,784 B2 | 9/2004 | Takahashi et al. | |
| 6,815,858 B2 | 11/2004 | Matsunobu et al. | |
| 6,815,859 B2 | 11/2004 | Sakuma et al. | |
| 6,987,341 B2 | 1/2006 | Chang et al. | |
| 7,038,345 B2 | 5/2006 | Fratta | |
| 7,091,643 B2 | 8/2006 | Burgbacher | |
| 7,436,096 B2 | 10/2008 | Guven et al. | |
| 7,498,708 B2 | 3/2009 | Brown et al. | |
| 7,504,754 B2 | 3/2009 | Jahns et al. | |
| 7,847,456 B2 | 12/2010 | Kori et al. | |
| 7,851,958 B2 | 12/2010 | Cai et al. | |
| 7,902,710 B2 | 3/2011 | Han et al. | |
| 8,020,280 B2 * | 9/2011 | Fukumaru et al. | 29/598 |
| 2005/0269888 A1 * | 12/2005 | Utaka | 310/156.53 |
| 2009/0212652 A1 * | 8/2009 | Nakamasu et al. | 310/156.53 |
| 2009/0261679 A1 * | 10/2009 | Sakai et al. | 310/156.53 |

(Continued)

FOREIGN PATENT DOCUMENTS

JP 2012-80607 A 4/2012

OTHER PUBLICATIONS

International Search Report Dated Aug. 1, 2013 (Nine (9) pages).

*Primary Examiner* — Burton Mullins
(74) *Attorney, Agent, or Firm* — Day Pitney LLP

(57) ABSTRACT

A multilayer laminated rotor is mountable on a shaft for rotation relative to a stator of a rotary electric machine arrangement. The rotor has a plurality of laminas, joined together, and voids for receiving magnets. An annular rotor section, which surrounds a shaft opening within which the shaft is receivable, extends between the shaft opening and a radially outer circumferential rotor surface. The annular section mentioned includes an undulating series of the voids in void groups extending from the radially outer circumferential rotor surface inwardly toward the shaft opening and then back toward the radially outer circumferential rotor surface, as well as a solid radially interior portion without any of the voids. Distal voids in the void groups include curved, arcuate, or recurved stress relieving features extending inwardly from radially innermost corner locations of the distal voids.

20 Claims, 2 Drawing Sheets

(56) References Cited

U.S. PATENT DOCUMENTS

| | | |
|---|---|---|
| 2011/0260566 A1 | 10/2011 | Odvarka et al. |
| 2011/0298325 A1 | 12/2011 | Rombach |
| 2012/0032539 A1 | 2/2012 | Hori et al. |
| 2012/0074801 A1 | 3/2012 | Brown et al. |

* cited by examiner

ROTOR LAMINATION STRESS RELIEF

Cross-reference is made to commonly assigned, co-pending U.S. patent application Ser. No. 13/424,579, filed Mar. 20, 2012, titled CANTILEVERED ROTOR MAGNET SUPPORT.

BACKGROUND OF THE INVENTION

1. Field of the Invention

This invention concerns stress relief in a multilayer rotor configuration usable in a rotary electric machine arrangement.

2. Description of Related Art

U.S. Pat. No. 6,794,784 to Takahashi et al. discloses a rotor core having permanent magnets received in embedding holes provided, in one arrangement, with radiussed portions serving to minimize stress.

U.S. Pat. No. 7,436,096 to Guven et al. illustrates the orientation of magnetic flux created by adjacent magnet clusters.

U.S. Pat. No. 7,498,708 to Brown et al. concerns a rotor core including web material disposed between adjacent magnet receiving slots and providing improved stress reduction and magnet restraint.

U.S. Pat. No. 5,117,553 to Kliman, U.S. Pat. No. 6,225,724 to Toide et al., U.S. Pat. No. 6,340,857 to Nishiyama et al., U.S. Pat. No. 6,525,442 to Koharagi et al., U.S. Pat. No. 6,700,288 to Smith, U.S. Pat. No. 6,815,858 to Matsunobu et al., U.S. Pat. No. 6,815,859 to Sakuma et al., U.S. Pat. No. 6,987,341 to Chang et al., U.S. Pat. No. 7,038,345 to Fratta, U.S. Pat. No. 7,091,643 to Burgbacher, U.S. Pat. No. 7,504,754 to Jahns et al., U.S. Pat. No. 7,847,456 to Kori et al., U.S. Pat. No. 7,851,958 to Cai et al., and U.S. Pat. No. 7,902,710 to Han et al., and U.S. Patent Application Publication 2012/0074801 to Brown et al. may also be of interest.

The disclosures of U.S. Pat. No. 6,794,784 to Takahashi et al., U.S. Pat. No. 7,436,096 to Guven et al., and U.S. Pat. No. 7,498,708 to Brown et al. are all incorporated herein by reference in their entireties as non-essential subject matter.

SUMMARY OF THE INVENTION

A multilayer laminated rotor according to this invention is mountable on a shaft for rotation relative to a stator of a rotary electric machine arrangement. The rotor has a plurality of laminas, joined together, and voids for receiving magnets. The rotor has an annular section, surrounding a shaft opening within which the shaft is receivable, that extends between the shaft opening and a radially outer circumferential rotor surface. The annular section mentioned includes an undulating series of the voids in void groups extending from the radially outer circumferential rotor surface inwardly toward the shaft opening and then back toward the radially outer circumferential rotor surface, as well as a solid radially interior portion without any of the voids. Distal voids in the void groups include curved, arcuate, or recurved void sections extending inwardly from radially innermost corner locations of the distal voids. These inwardly extending void sections delimit the solid radially interior portion of the annular section. The undulating series of voids extends circumferentially completely around the rotor.

The void sections are shaped so as to extend primarily parallel to a magnetic flux direction when the rotor is in use, and provide stress relief to webs of material located between the pair of distal voids and an intermediate void interposed between the distal voids. This stress relief results from displacement of rotor hoop stress away from the webs of material mentioned.

The invention additionally concerns an individual lamina to be included in a multilayer laminated rotor such as that referred to.

DETAILED DESCRIPTION OF THE INVENTION

Figure 1:
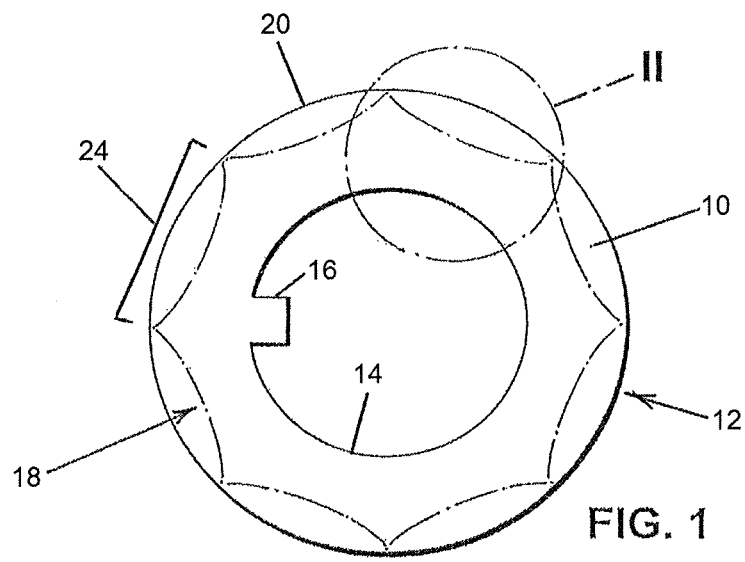
FIG. 1 is a schematic plan view of an end of a rotor that supports permanent magnets according to the invention.

An interior permanent magnet rotor lamina 10 used in production of a multilayer laminated rotor according to the present invention is shown, in plan view, in FIG. 1. It will be understood by those of ordinary skill in the art that the lamina 10 shown in FIG. 1 is an endmost lamina of multiple (e.g., fifty) laminas joined together in a lamination stack to produce the rotor 12 constituting part of a rotary electric machine arrangement, such as a motor, generator, or motor/generator. The laminas may be stamped from sheets of steel or other suitable material. A rotor shaft (not shown) is receivable within a shaft opening 14 of the rotor 12 to impart rotational motion to the rotor. A radially inwardly projecting tooth or key 16 may be used in conjunction with a corresponding recess in the rotor shaft to help secure the rotor 12 against rotation relative to the rotor shaft.

Figure 2:
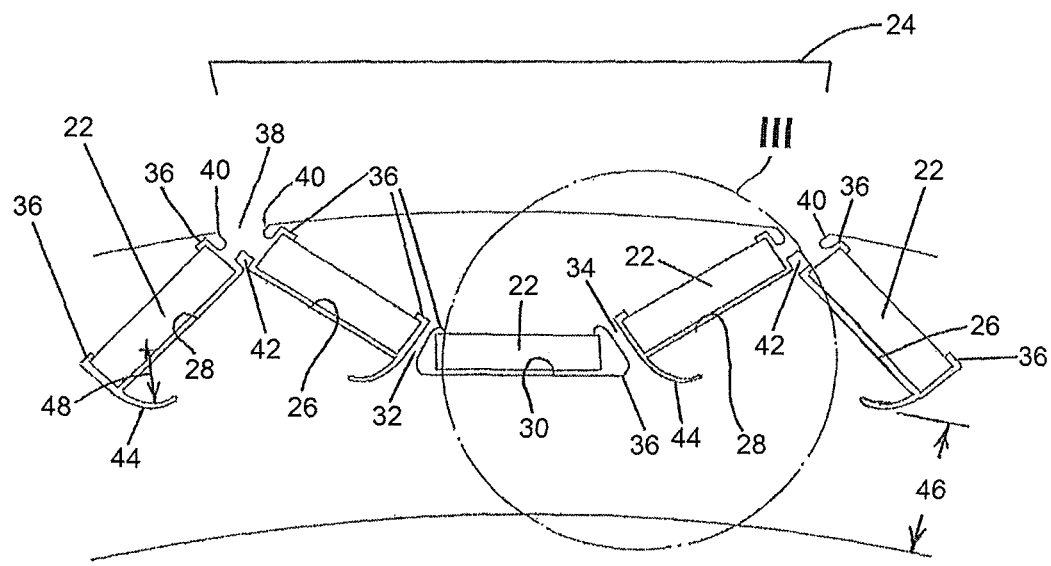
FIG. 2 is an enlarged view of an area II of the rotor shown in FIG. 1.

Each lamina 10 has an annular section surrounding the shaft opening 14 and extending between that shaft opening 14 and a radially outer circumferential surface 20 of the overall rotor 12. The annular section is provided with a series 18 of magnet receiving holes, voids, or orifices (hereafter referred to as voids for simplicity) located adjacent a radially outer lamina surface. When the laminas 10 are joined together in a stack to collectively define the rotor 12, the voids of adjacent laminas align and are located near the radially outer circumferential rotor surface 20. Permanent magnets 22 are receivable within the voids, as shown in FIG. 2. The permanent magnets 22 may be inserted into the voids after the laminas 10 are joined together, or, if desired, the voids may be aligned with the magnets 22 as the laminas 10 are slid over the magnets 22 so that the magnets 22 serve as guides to position the laminas 10 properly during rotor construction. Once a selected number of laminas 10 have been joined together, the magnets 22 have been potted, glued, or otherwise secured in place, and the laminated rotor 12 is completed, the permanent magnets 22 extend axially relative to the rotor 12 through the aligned voids of the stack of laminas 10 to a desired extent. The magnets 22 thereafter remain fixed within the voids to cooperate with windings disposed around poles of a stator, within which the overall rotor 12 is rotatable.

As FIG. 1 shows, the series 18 of voids undulates, and is composed of a multiplicity of void groups 24. Each void group 24 extends from the radially outer circumferential rotor surface inwardly toward the shaft opening 14 and then back toward the rotor surface 20. The series 18 extends circumferentially completely around the lamination and, therefore, the rotor including that lamination. In the arrangement illustrated in FIGS. 1 and 2, each void group 24 includes a pair of opposite distal end voids 26 and 28, and an intermediate central void 30. Each of the end voids 26, 28 is separated from the adjacent central void 30 by a respective web 32, 34 of lamina material. The voids 26, 28, and 30 may include recessed fillets 36 at some of their corners for optimal stress concentration properties.

In the particular arrangement shown, as with the arrangement forming the subject matter of co-pending U.S. patent application Ser. No. 13/424,579 mentioned above, rotor lamina material is removed from or left out of the outer diameter region of the end voids in each void group. Avoiding the presence of this rotor lamina material has a structural benefit, as it eliminates rotational hoop stresses from the typically thin outer sections of the lamination webs, and instead forces the structural support to be cantilevered. It is to be understood that, although the particular arrangement used by way of example to describe the present invention in detail includes cantilevered magnet supports, the stress relief features according to the present invention are not limited in application to support webs with cantilevered magnet supports.

The series 18 of voids is arranged in such a way that, throughout the rotor 12, the distal voids 26, 28 of adjacent void groups 24 are located next to each other. In the cantilevered arrangement shown by way of example, the distal voids 26, 28 in each of the void groups 24, together with distal voids of adjacent void groups, define gaps 38 separating adjacent arc sections of the radially outer circumferential rotor surface 20. These gaps 38 may be produced by machining away or leaving out rotor material between the adjacent arc sections. Although such a construction leaves the distal voids 26, 28 open and exposed, flanges, nubs, bumps, or other protrusions 40 of material at adjacent ends of the rotor surface arc sections and common interior flanges, nubs, bumps, or other protrusions 42 of material located between the distal voids 26, 28 help in positioning and retaining magnets 22 within the voids 26, 28. Different types of void series patterns, of course, can be utilized; such patterns, for example, could be roughly u-shaped, similar to that of the series 18, roughly v-shaped, or flattened.

As noted, the voids 26, 28, and 30 may include recessed fillets 36 at some of their corners for optimal stress concentration properties. According to the present invention, in addition to these fillets 36, further features 44 are included as extensions of the end voids 26 and 28 in each void group 24 to provide stress relief to the narrow webs 32, 34 of lamina material in each group. The stress relieving "web tail" features 44 referred to extend inwardly from radially innermost corner locations of the end or distal voids 26 and 28, and are additional curved, arcuate, or recurved void sections producing a modified rotor lamination geometry with reduced web stress at high rotational speeds. At the same time, the particular way in which the stress relieving features 44 are configured minimizes the electromagnetic impact of those features 44.

Figure 3:
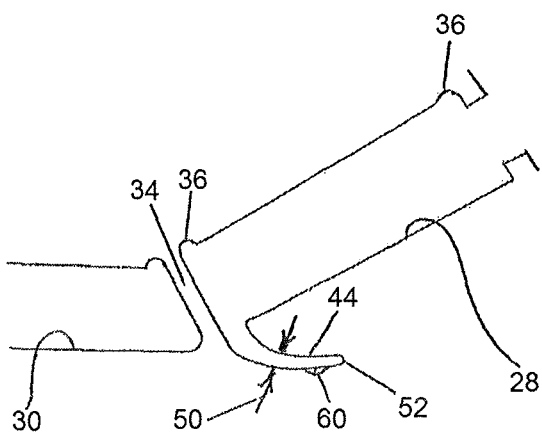
FIG. 3 is a further enlarged view of a portion III of the area shown in FIG. 2.

Although the rotor 12 of the present invention does not include separate outer and inner radial permanent magnet layers such as those present in the rotor forming the subject matter of U.S. Pat. No. 7,436,096 to Guven et al. mentioned above, the present invention will have a magnetic flux orientation that is generally the same as that produced by the Guven et al. ('096) inner radial permanent magnet layer, and it will be understood from FIGS. 2 and 3 that the added stress relieving features 44 of the present invention extend primarily parallel to the direction of magnetic flux. The geometries of the stress relieving features 44 displace the rotor hoop stress towards the solid radially interior portion 46 of the rotor 12 and away from the support webs 32 and 34. The solid radially interior rotor portion 46 mentioned is delimited by the stress relieving features 44.

To reduce stress concentration, a large radius 48 is utilized to define a path followed by each feature 44 so that the feature curves radially inwardly and then back radially outwardly with respect to the overall rotor 12. The thickness 50 of the void defining each feature 44 can remain small, minimizing flux impact, by having the feature 44 turn "upwards" and terminate at an end 52 (FIG. 3) disposed away from the structural hoop defined by the solid radially interior rotor portion 46. Since one alternative would be to increase the cross-section of the structural hoop by reducing the rotor inner diameter defined by the shaft opening 14, the stress relief provided by the features 44 allows use of rotors having reduced mass. Again, it is to be understood that the stress relief arrangement according to the present invention is not limited to support webs that have cantilevered magnet supports.

Figure 4:
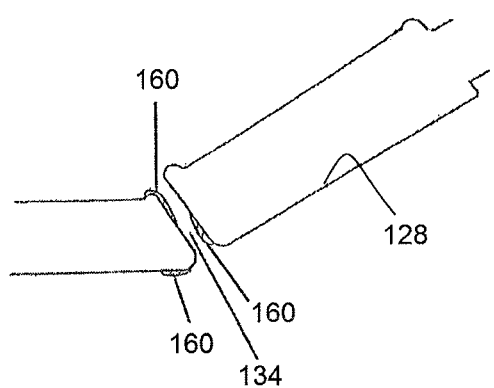
FIG. 4 is a view similar to FIG. 3 but of part of a conventional rotor.

FIG. 4 provides a schematic view of an enlarged rotor area surrounding one end void 128 of a void group included in a conventionally structured rotor, without stress relieving features according to the present invention. The shaded areas 160 in FIG. 4 identify locations of maximum static structural equivalent stress imposed during operation of a conventionally structured rotor. By contrast, in a rotor according to the present invention, including the stress relieving features 44, the locations of maximum static structural equivalent stress imposed during operation occur adjacent the ends 52 of the stress relieving features 44 and away from the narrow webs 32, 34 of lamina material. One such location is identified by the shaded area 60 in FIG. 3.

A rotor incorporating rotor lamination geometry according to the present invention allows for reduced mechanical stress and reduced electromagnetic degradation from stress relief features. The geometry utilized according to the invention permits production of higher speed, higher performance electric motors and generators in a relatively simple manner, and allows rotors having reduced mass as well.

The foregoing disclosure has been set forth merely to illustrate the invention and is not intended to be limiting. Modifications of the disclosed embodiments incorporating the spirit and substance of the invention may occur to persons skilled in the art, and the invention should be construed to include everything within the scope of the invention ultimately claimed.

The invention claimed is:

1. A multilayer laminated rotor, mountable on a shaft for rotation relative to a stator of a rotary electric machine arrangement, having a plurality of laminas joined together to form the rotor with voids for receiving magnets, the rotor comprising:
    an annular section surrounding a shaft opening within which the shaft is receivable, the annular section extending between the shaft opening and a radially outer circumferential rotor surface, the annular section including an undulating series of the voids in void groups extending from the radially outer circumferential rotor surface inwardly toward the shaft opening and then back toward the radially outer circumferential rotor surface as well as a solid radially interior portion without any of the voids,
    wherein a pair of distal voids in each void group include curved, arcuate, or recurved void sections curving radially inwardly with respect to the rotor from radially innermost corner locations of said pair of distal voids and then turning back radially outwardly with respect to the rotor so that ends of the void sections are disposed away from the solid radially interior portion of the annular section.

2. The rotor of claim 1, wherein the undulating series of voids extends circumferentially completely around the rotor.

3. The rotor of claim 1, wherein the void sections provide stress relief to webs of material located between said pair of distal voids and an intermediate void interposed between the distal voids.

4. The rotor of claim 3, wherein the stress relief is provided by displacement of rotor hoop stress away from the webs of material.

5. The rotor of claim 1, wherein the void sections extend primarily parallel to a magnetic flux direction when the rotor is in use.

6. The rotor of claim 2, wherein the void sections extend primarily parallel to a magnetic flux direction when the rotor is in use.

7. The rotor of claim 3, wherein the void sections extend primarily parallel to a magnetic flux direction when the rotor is in use.

8. The rotor of claim 4, wherein the void sections extend primarily parallel to a magnetic flux direction when the rotor is in use.

9. A multilayer laminated rotor, mountable on a shaft for rotation relative to a stator of a rotary electric machine arrangement, having a plurality of laminas joined together to form the rotor with voids for receiving magnets, the rotor comprising:

an annular section surrounding a shaft opening within which the shaft is receivable, the annular section extending between the shaft opening and a radially outer circumferential rotor surface, the annular section including an undulating series of the voids in void groups extending from the radially outer circumferential rotor surface inwardly toward the shaft opening and then back toward the radially outer circumferential rotor surface as well as a solid radially interior portion without any of the voids, wherein a pair of distal voids in each void group include void sections that extend radially inwardly with respect to the rotor from radially innermost corner locations of said pair of distal voids and then turn back radially outwardly with respect to the rotor so that ends of the void sections are disposed away from the solid radially interior portion of the annular section, and displace rotor hoop stress towards the solid radially interior portion and away from webs of material located between said pair of distal voids and an intermediate void interposed between the distal voids.

10. The rotor of claim 9, wherein the undulating series of voids extends circumferentially completely around the rotor.

11. The rotor of claim 9, wherein the void sections extend primarily parallel to a magnetic flux direction when the rotor is in use.

12. The rotor of claim 10, wherein the void sections extend primarily parallel to a magnetic flux direction when the rotor is in use.

13. A lamina to be included in a multilayer laminated rotor, mountable on a shaft for rotation relative to a stator of a rotary electric machine arrangement, with voids for receiving magnets, the lamina comprising:

an annular section surrounding a shaft opening, the annular section extending between the shaft opening and a radially outer circumferential lamina surface, the annular section including an undulating series of the voids in void groups extending from the radially outer circumferential lamina surface inwardly toward the shaft opening and then back toward the radially outer circumferential lamina surface as well as a solid radially interior portion without any of the voids, wherein a pair of distal voids in each void group include curved, arcuate, or recurved void sections curving radially inwardly with respect to the lamina from radially innermost corner locations of said pair of distal voids and then turning back radially outwardly with respect to the lamina so that the ends of the void sections are disposed away from the solid radially interior portion of the annular section.

14. The lamina of claim 13, wherein the undulating series of voids extends circumferentially completely around the lamina.

15. The lamina of claim 13, wherein the void sections provide stress relief to webs of material located between said pair of distal voids and an intermediate void interposed between the distal voids.

16. The lamina of claim 15, wherein the stress relief is provided by displacement of hoop stress away from the webs of material.

17. The lamina of claim 13, wherein the void sections extend primarily parallel to a magnetic flux direction when the lamina is in use.

18. A lamina to be included in a multilayer laminated rotor, mountable on a shaft for rotation relative to a stator of a rotary electric machine arrangement, with voids for receiving magnets, the lamina comprising:

an annular section surrounding a shaft opening, the annular section extending between the shaft opening and a radially outer circumferential lamina surface, the annular section including an undulating series of the voids in void groups extending from the radially outer circumferential lamina surface inwardly toward the shaft opening and then back toward the radially outer circumferential lamina surface as well as a solid radially interior portion without any of the voids, wherein a pair of distal voids in each void group include void sections that extend radially inwardly with respect to the lamina from radially innermost corner locations of said pair of distal voids and then turn back radially outwardly with respect to the lamina so that ends of the void sections are disposed away from the solid radially interior portion of the annular section, and displace rotor hoop stress towards the solid radially interior portion and away from webs of material located between said pair of distal voids and an intermediate void interposed between the distal voids.

19. The lamina of claim 18, wherein the undulating series of voids extends circumferentially completely around the lamina.

20. The lamina of claim 18, wherein the void sections extend primarily parallel to a magnetic flux direction when the lamina is in use.

* * * * *